US006926491B2

(12) United States Patent
Migler

(10) Patent No.: US 6,926,491 B2
(45) Date of Patent: Aug. 9, 2005

(54) VERTICAL AXIS WIND TURBINE WITH CONTROLLED GYBING

(76) Inventor: Bernard Migler, 1405 Autumn La., Cherry Hill, NJ (US) 08003

( * ) Notice: Subject to any disclaimer, the term of this patent is extended or adjusted under 35 U.S.C. 154(b) by 0 days.

(21) Appl. No.: 10/681,755

(22) Filed: Oct. 8, 2003

(65) Prior Publication Data

US 2004/0228729 A1 Nov. 18, 2004

Related U.S. Application Data

(60) Provisional application No. 60/469,240, filed on May 12, 2003.

(51) Int. Cl.[7] ................................................. F03D 5/06
(52) U.S. Cl. .......................... 415/4.4; 415/907; 416/17; 416/119; 416/132 A; 416/132 B; 416/146 R
(58) Field of Search .................... 415/4.4, 907, 150; 416/17, 119, 132 A, 132 B, 146 R, 155, 108–111, 197 A, 197 R; 290/42–44, 55, 54, 53

(56) References Cited

U.S. PATENT DOCUMENTS

| 232,205 | A | * | 9/1880 | Preston | ........................ 416/119 |
| 2,038,467 | A | * | 4/1936 | Zanoski | ....................... 416/119 |
| 5,844,323 | A | * | 12/1998 | Hung | ........................... 290/54 |
| 6,116,178 | A | * | 9/2000 | McCabe | ................. 114/102.13 |
| 6,688,842 | B2 | * | 2/2004 | Boatner | ....................... 415/4.2 |

* cited by examiner

Primary Examiner—Ninh H. Nguyen

(57) ABSTRACT

A device for generating electricity in which wind blowing from any direction causes the rotation of sails around a vertical tower. As the sails rotate the sails moving toward the wind are automatically feathered, and the sails moving away from the direction of the wind are prevented from being feathered by sail restraints. An inner sail restraint positions each sail so that the sail gybes at an earlier time than would otherwise occur. An outer sail restraint "catches" the sail as it gybes, capturing much of the energy of the gybe, adding additional rotational force. The device may be used to extract energy from the wind to produce electricity.

10 Claims, 8 Drawing Sheets

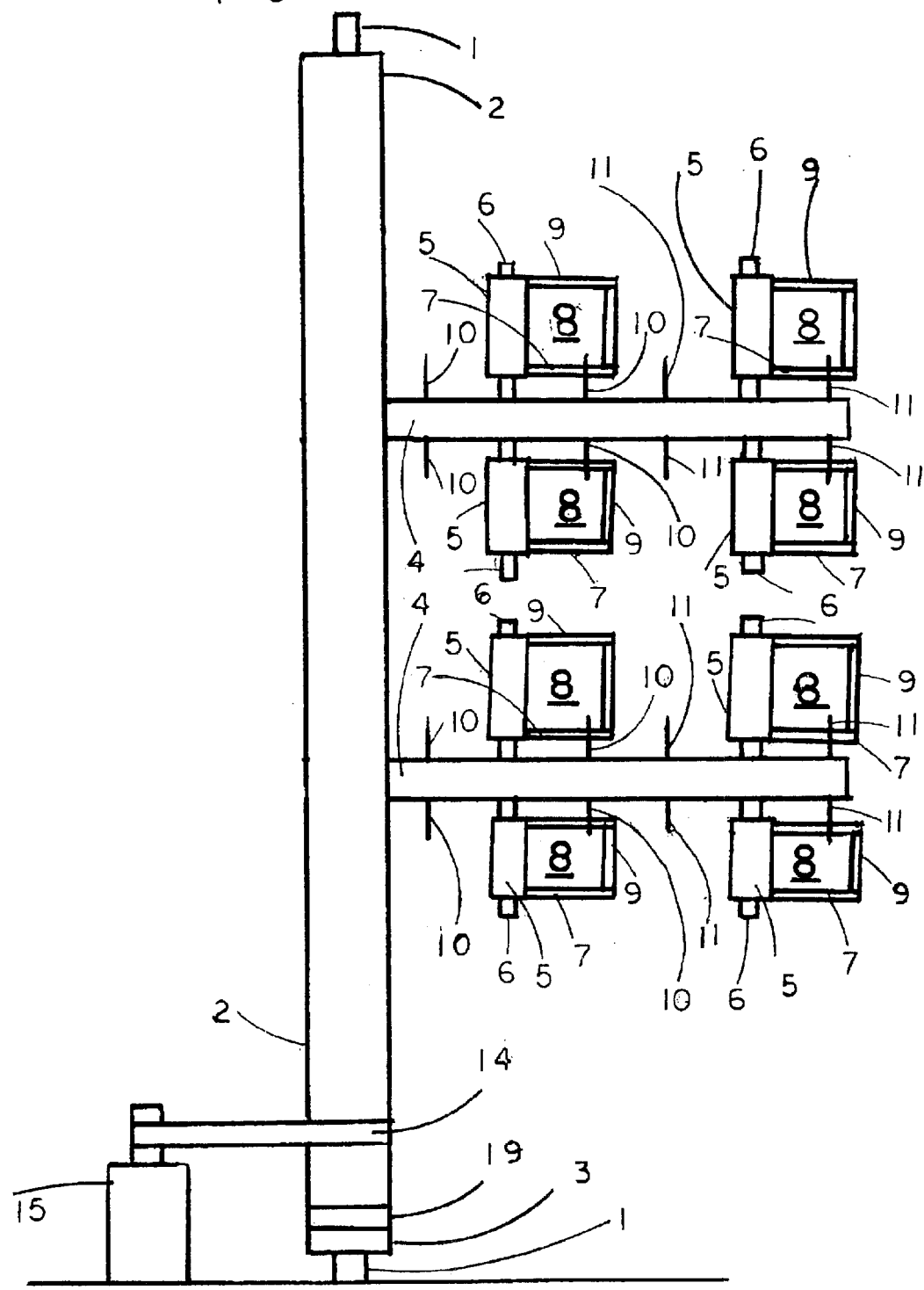

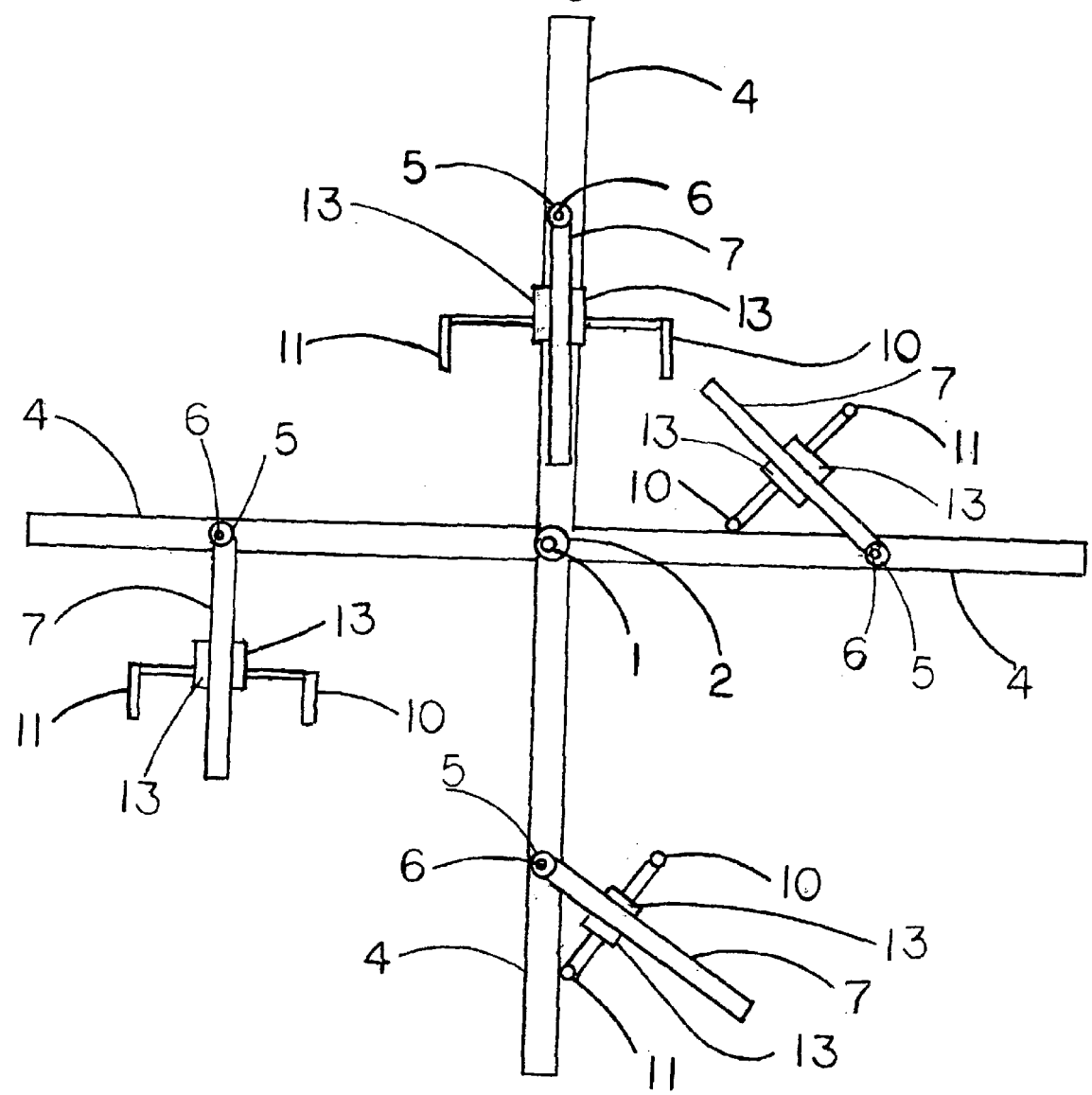

VERTICAL AXIS WIND TURBINE WITH CONTROLLED GYBING

CROSS REFERENCE TO RELATED APPLICATIONS

The present application claims the benefit of provisional application # 60/469,240 filed May 12, 2003.

FIELD OF THE INVENTION

The device relates generally to the field of windmills or wind turbines for the production of electricity. More specifically it relates to the field of vertical axis wind turbines.

BACKGROUND OF THE INVENTION

Windmills may be constructed using either a horizontal axis, as in most modem wind turbines, or using a vertical axis, as in the earliest windmills. The first vertical axis windmills are usually attributed the to Persians or to the Chinese during the period 500 to 900 C.E. These windmills were used to grind grain or to pump water. Today however, horizontal axis wind turbines are the dominant variety and are used to generate electricity. They are being installed in large numbers, particularly in Europe and are able to produce megawatt quantities of electricity. These large wind turbines are expensive, costing approximately $1 million dollars each in 2003 and, for this reason, are usually owned by utilities. The diameters of the newest machines are 328 feet, with towers of 200 feet or more. These machines are clearly not appropriate for a small farmer wishing to extract energy from the wind to produce electricity for domestic use, for net metering, or for sale to electric grids.

Early in their careers sailors learn to beware of an accidental gybe when sailing, in particular when "running" with the wind. The danger of an accidental gybe is given by the following quote from the classic book of sailing "Chapman's book on Piloting: Seamanship and Small Boat Handling, 60$^{th}$ Edition" by E. S. Malony: "Whenever jibing (gybing) or close to a jibe, watch for an accidental jibe—one for which the crew is not prepared. With inattentive steering the wind may catch the back side of the sail and throw the boom violently across the boat to the other side, risking serious damage to the rigging and to the heads of crewmembers."

A vertical axis wind turbine would normally produce an uncontrolled gybe when the wind catches the back side of the sail. The energy of the wind in producing this uncontrolled gybe is normally lost and not used to add force to the rotation.

BRIEF SUMMARY OF THE INVENTION

Vertical axis wind turbines have not effectively captured the energy of the uncontrolled gybe that results when a sail points downwind. The present invention addresses and solves this problem by the use of strategically placed sail restraints.

In several aspects the invention consists of a tower onto which the device is mounted. In one aspect a number of vertical rotatable sails are mounted onto a horizontal rotatable framework. When the wind blows onto the device the sails on one side are feathered, and one or more sails on the other side are restrained from feathering by sail restraints. The sails that are restrained from feathering are pushed by the wind and cause the device to rotate. In another aspect each sail is positioned by a sail restraint so that it gybes at an earlier time than otherwise would occur, and a second sail restraint then captures the sail as it gybes, adding gybe energy to the rotation. The rotation of the device may be used to power an electric generator.

BRIEF DESCRIPTION OF SEVERAL VIEWS OF THE DRAWINGS

The invention is not intended to be limited to the precise arrangements and instrumentalities shown.

FIG. 7 is a side view of a part of an embodiment of the invention.

FIG. 9 is a cross sectional, overhead view of an embodiment of the invention.

DETAILED DESCRIPTION OF THE INVENTION

Figure 1:
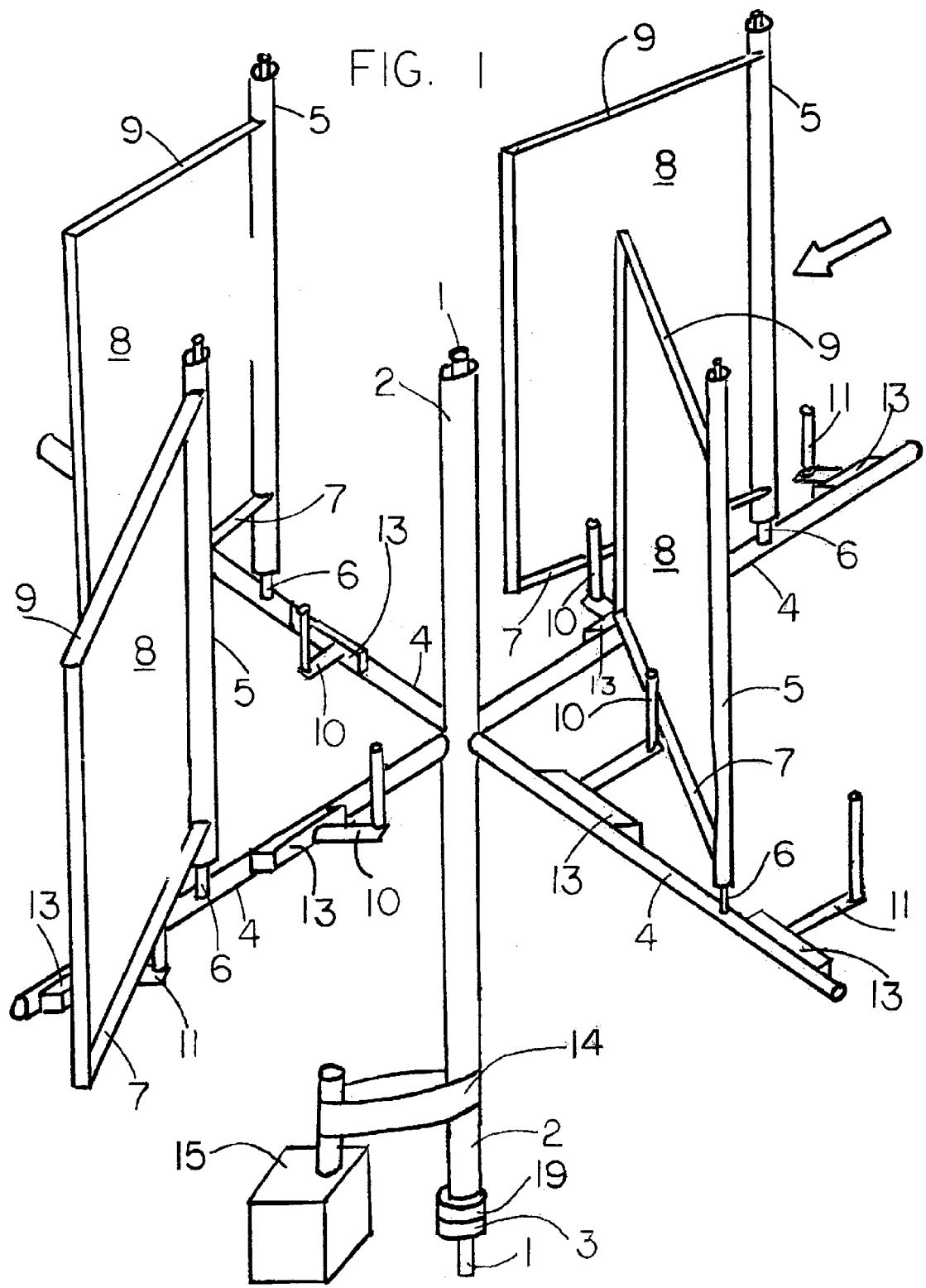
FIG. 1 is a perspective view of a first embodiment of the invention.
Figure 5:
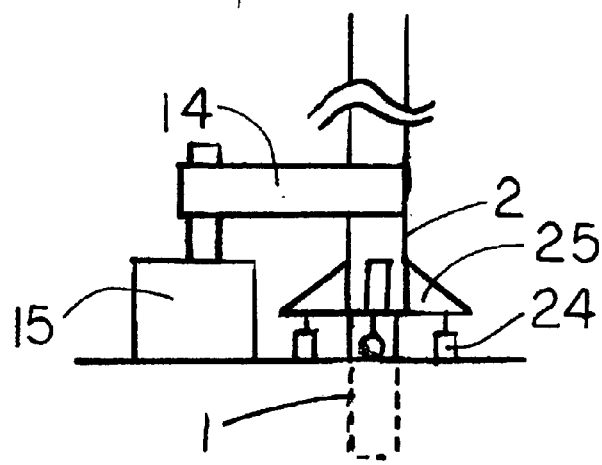
FIG. 5 is a side view of a lower end for use with an embodiment of the invention.

Referring now to the drawing in FIG. 1 in detail, there is shown a perspective view of the structure of a self-feathering vertical axis wind turbine with controlled gybing. The direction of the incoming wind is indicated by the arrow in the upper right hand corner of the figure. A vertical tower 1 is secured to the ground or to any other secure structure. A cylindrical vertical member 2 or "tower-collar," is mounted on said tower 1 and is able to rotate freely around the tower on thrust bearings 19 supported by a shaft-collar 3 secured to the base of the tower. Additional friction reducing radial bearings (not shown) may be mounted on the tower 1 between the tower-collar 2 and the tower 1 to reduce friction as the tower-collar rotates around the tower. Horizontal arms 4 are secured to the tower-collar. A vertical member, or "mast" 6 is secured to each horizontal arm 4. A cylindrical vertical collar 5 or "mast-collar" is mounted on said mast 6 and is able to rotate freely around the mast 6 on friction-reducing bearings (not shown.) A rigid horizontal member, or "boom" 7 is secured to each mast-collar 5 near the boom 7. Sails, 8 constructed of nonflexible or flexible material are secured to their booms 7 and mast-collars 5. Additional strengthening and support of the sail 8 is provided by horizontal and vertical members forming a frame 9 around the sail 8. An "inner sail restraint" 10 located between the tower-collar 2 and mast 6 is secured to the horizontal arm 4. The angle formed by the boom 7 (when it is in contact with the inner sail restraint 10,) the mast 6 and the horizontal arm 4 (with the mast 6 as the common point of the angle) is approximately 45 degrees (See FIG. 3.) The height of the inner sail restraint 10 is greater than the distance from the horizontal arm 4 to boom 7 and the inner sail restraint 10 is therefore in position to restrain the rotation of boom 7 (and sail 8) when it approaches the horizontal arm 4. An "outer sail restraint" 11 located between the mast 6 and the end of a horizontal arm 4 is secured to the horizontal arm 4. The angle formed by the boom 7 (when it is in contact with the outer sail restraint 11,) the mast 6 and the horizontal arm 4 (with the mast 6 as the common point of the angle) is approximately 45 degrees (See FIG. 3.) The height of outer sail restraint 11 is greater than the distance from the horizontal arm 4 to boom 7. The outer sail restraint 11 is therefore in position to restrain the rotation of boom 7 (and sail 8) when it approaches the horizontal arm 4. The inner sail restraint 10 and the outer sail restraint 11 are secured to motorized sail restraint controllers 13 that are able to rotate the inner sail restraint 10 and outer sail restraint 11 to a horizontal position (as shown in FIG. 5.) A driving belt 14 is mounted at the lower end of the tower-collar 2 and drives a generator 15 to generate electricity. In other embodiments, conventional means such as a chain drive or direct gear drive is used in place of the belt drive 14 to drive the generator. In another embodiment the generator 15 may be mounted on the tower 1 below the tower-collar 2.

FIG. 1 shows the device with four horizontal arms 4 and four sails 8. In other embodiments the number of horizontal 4 arms and sails 8 may be as few as two, or greater than four.

Figure 2:
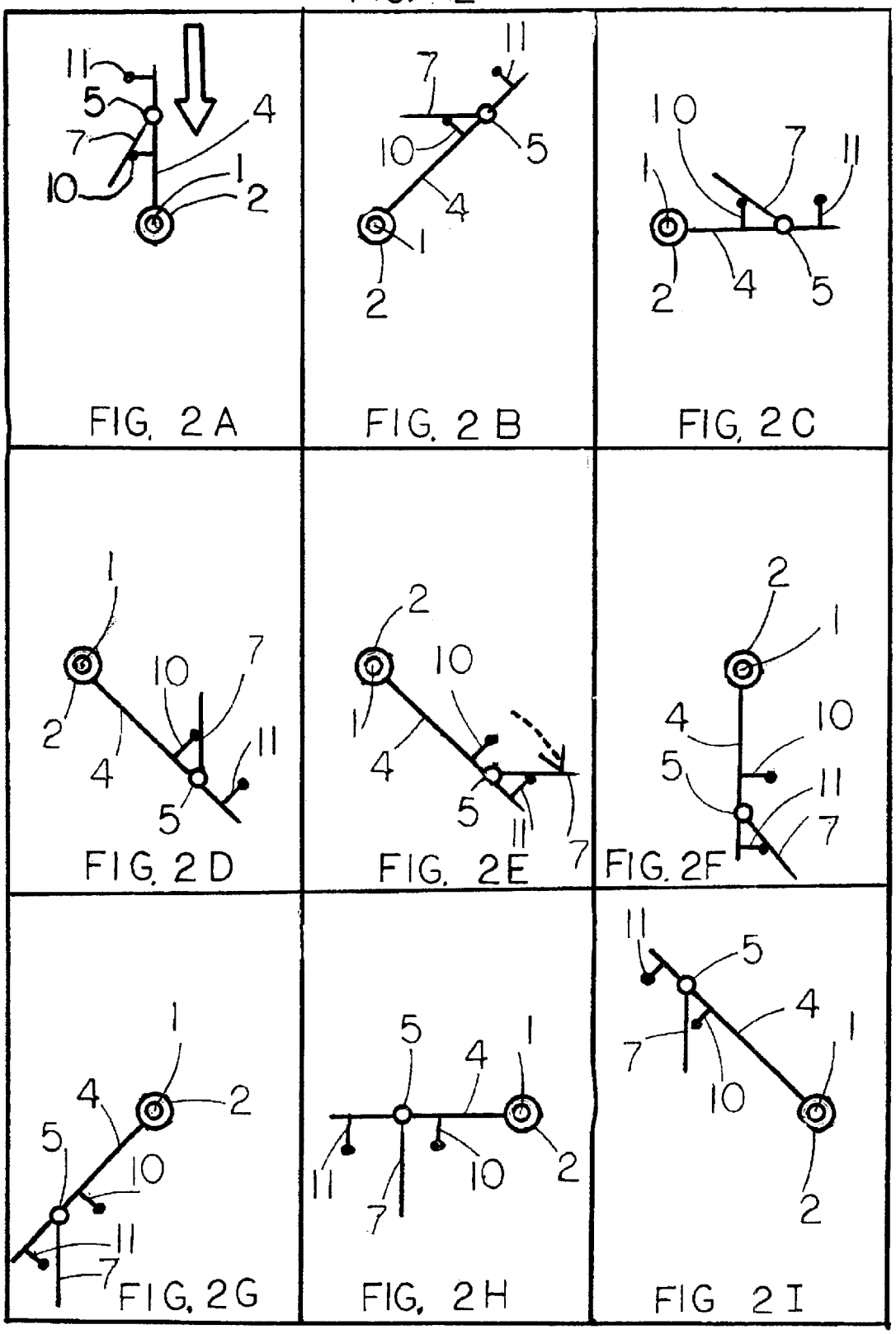
FIG. 2 is a cross sectional, overhead view of part of the embodiment shown in FIG. 1.

Referring now to the drawing in FIG. 2 there is shown an overhead view of the present invention including the tower 1, tower-collar 2, one horizontal arm 4, one mast-collar 5, one boom 7, one inner sail restraint 10, and one outer sail restraint 11. Additional horizontal arms are omitted to simplify the Figures. A sequence of nine Figures from FIG. 2-A to FIG. 2-I are shown. The sequence of Figures illustrate the action of the wind on the device. The arrow in FIG. 2-A indicates the direction of the wind and applies to all Figures. The Figures will illustrate the action of the wind on the device by following only a single boom 7 as it rotates 360 degrees around the device. It is of course understood that all the horizontal arms, booms, sail restraints and sails operate in the same fashion. In FIG. 2-A the boom 7 is in contact with the inner sail restraint 10. The boom 7 is held in a position of approximately 45 degrees with respect to the horizontal arm 4 on which it is mounted and is in position to begin its rotation in the clockwise direction. In FIG. 2-B the horizontal arm 4 has rotated approximately 45 degrees, and the boom 7 is still restrained by the inner sail restraint 10 which keeps the sail fully faced into the wind, providing driving force for rotation. In FIG. 2-C the horizontal arm 4 has rotated an additional 45 degrees, and the boom 7 continues to be restrained by the inner sail restraint 10. The position of the boom 7 facing obliquely into the wind continues to drive the horizontal arm 4 clockwise. In FIG. 2-D the horizontal arm 4 has rotated another 45 degrees, and the inner sail restraint 10 now forces the boom 7 (and sail, not shown) to point into the wind, making it vulnerable to an "uncontrolled gybe." In FIG. 2-E the horizontal arm 4 is shown in the same position as in FIG. 2-D, and the boom 7 (and sail, not shown) is shown having undergone an "uncontrolled" gybe of approximately 90 degrees. The boom 7 however is then "caught" by the outer sail restraint 11 and the energy in the remaining 90 degrees of the gybe, (of a normal 180 degree gybe) is harvested in rotating the device. In FIG. 2-F the horizontal arm 4 has rotated another 45 degrees. The boom 7 is still restrained by the outer sail restraint 11 and is facing obliquely into the wind continuing to provide driving force for rotation. In FIG. 2-G the boom 7 is pointing downwind. It is now free of both the inner sail restraint 10 and outer sail restraint 11 and is feathered, offering little or no resistance to the wind, as the horizontal arm 4 rotates clockwise into the wind. Frame 2-H is similar to FIG. 2-G except that the horizontal arm 4 has rotated another 45 degrees into the wind and the boom 7 is still feathered. In the last FIG. 2-I the horizontal arm 4 has brought the boom 7 which is still feathered, into position where it is about to contact the inner sail restraint 10 completing the cycle.

Returning once again to the drawing in FIG. 1 the sail 8 in the lower right corner of the FIG. 1, can now be understood as being in the position corresponding to the boom 7 (and sail) in FIG. 2-C, that is, it has been pushed by the wind approximately 90 degrees clockwise, but is not yet presenting its sail 8 directly into the wind for gybing. The sail 8 in the lower left corner of FIG. 1 corresponds to the boom 7 (and sail) position in FIG. 2-E that it, its sail has gybed and been caught by the outer sail restraint 11. The sail 8 in the upper left corner of FIG. 1 corresponds to the sail position in FIG. 2-H that is, its boom 7 (and sail) is pointing downwind and is feathered, offering little or no resistance to the wind. The next sail 8 clockwise, in the upper right corner of FIG. 1, corresponds to FIG. 2-A that is, its boom 7 (and sail) is in contact with the inner sail restraint 10 and the sail 8 is in position to begin the cycle again.

Figure 3:
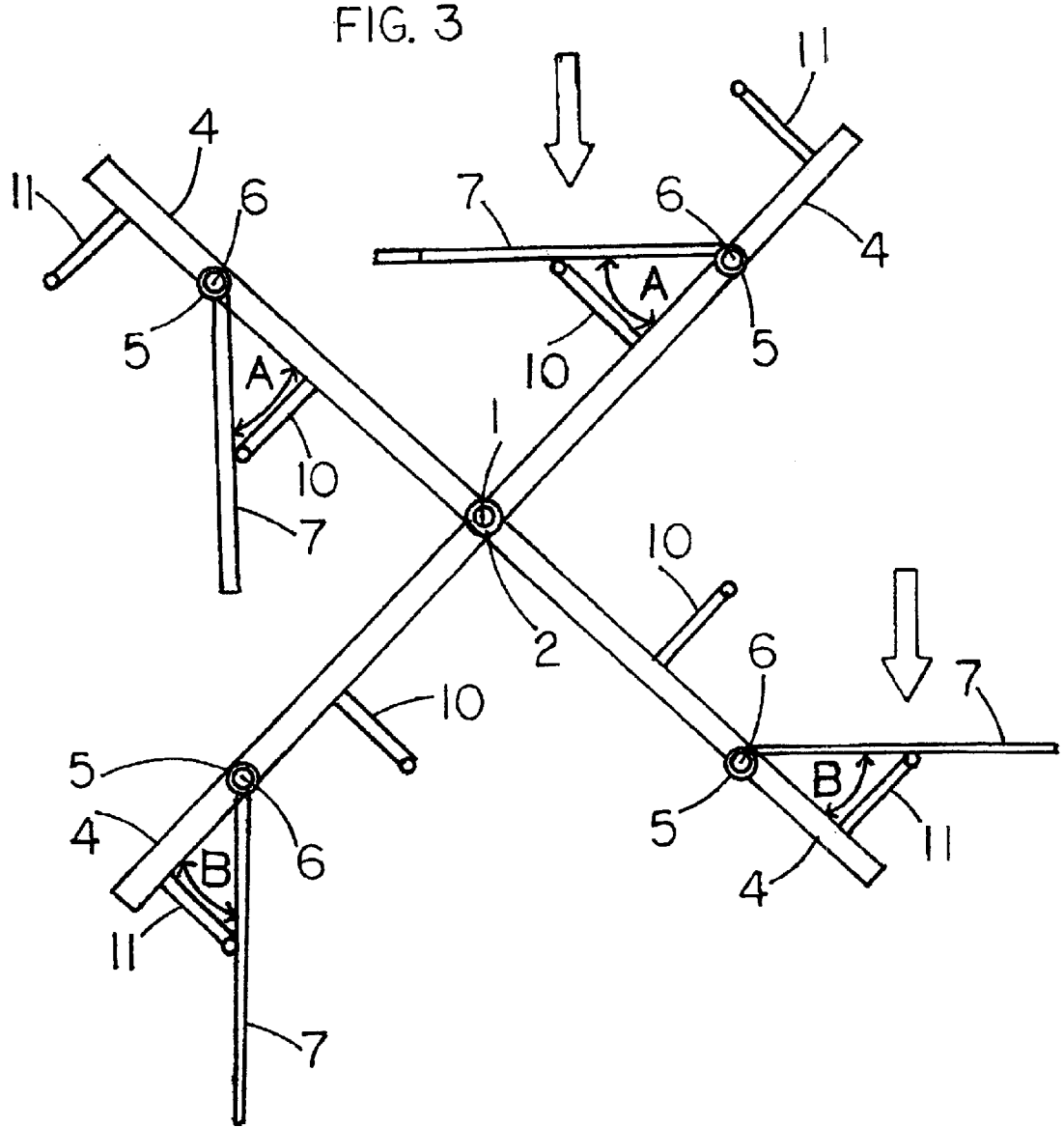
FIG. 3 is a cross sectional, overhead view of the embodiment shown in FIG. 1.

Referring now to the drawing in FIG. 3 in detail, there is shown a cross sectional, overhead view of the present invention at the level of the horizontal arms 4 including the tower 1, the tower-collar 2, horizontal arms 4, masts 6, mast-collars, booms 7, inner sail restraints 10, and outer 11 sail restraints. The arrows indicate the direction of the wind and the device should be understood as rotating clockwise. In the upper right hand corner of FIG. 3 Angle A, formed by the boom 7 (lying against the inner sail restraint 10) the mast collar 5 (serving as the point of the angle) and the horizontal arm 4, is substantially 45 degrees. The same is true for Angle A in the upper left hand corner of FIG. 3. In the lower right hand corner of FIG. 3, Angle B, formed by the boom 7 (lying against the outer sail restraint 11) and the horizontal arm 4, is substantially 45 degrees. The same is true for Angle B in the lower left hand corner of FIG. 3. FIG. 3 also shows that during the part of the rotation cycle illustrated in the Figure the two sails on the right hand side of the Figure are both simultaneously capturing the energy of the wind (as indicated by the arrows pointing to each of those two sails.) This is due to the gybe that has just taken place for the sail in the lower right corner. The gybe has moved the lower right hand sail to the outside position where it is restrained by the outer sail restraint 11 allowing the two sails to be driven simultaneously. It may also be noted that the sail in the upper right hand corner is not hindering the sail in the lower right hand position due to the gybe that has taken place.

Figure 4:
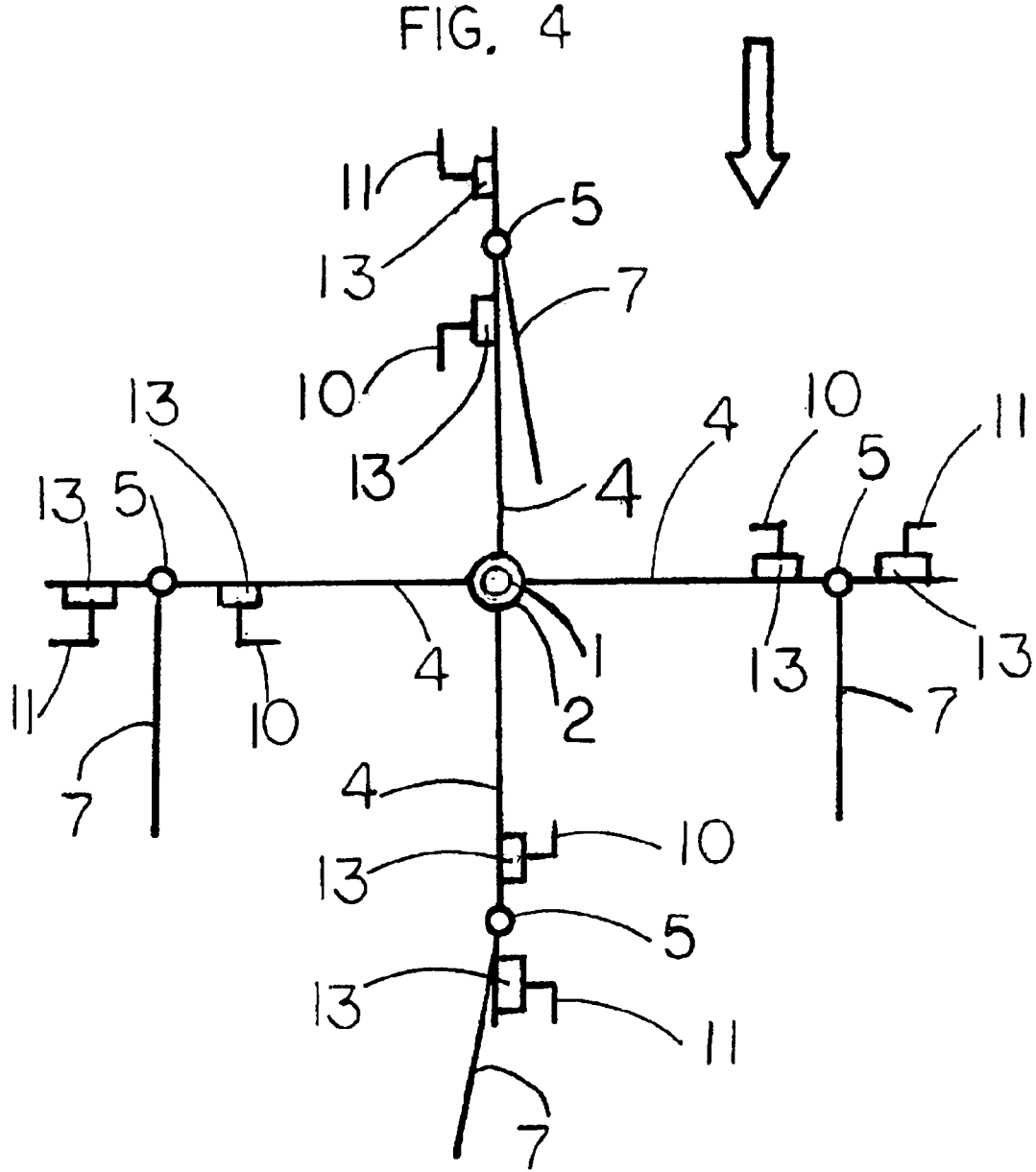
FIG. 4 is a cross sectional, overhead view of the embodiment shown in FIG. 1.

Referring now to the drawing in FIG. 4 in detail, there is shown a cross sectional, overhead view of the present invention at the level of the horizontal arms 4 and the booms 7. FIG. 4 shows the tower 1, the tower-collar 2, horizontal arms 4, booms 7, mast collars 5, (masts are not shown) inner sail restraints 10, outer sail restraints 11, and motorized sail restraint controllers 13. The inner sail restraints 10 and the outer sail restraints 11 are shown rotated into a horizontal position by the motorized sail restraint controllers 13. In this position none of the sail restraints are able to restrain the booms 7. Accordingly, wind from the direction shown by the arrows, causes each boom 7 (and the sail secured to it, not shown) to become feathered. The motorized sail restraint controllers 13 are operated during excessively high winds speeds to avoid damage to the device.

Referring now to the drawing in FIG. 5 there is shown a side view of the base of an alternative embodiment of the device, showing the generator 15 driving belt 14 tower 1 and tower-collar 2. In addition, caster supports 25 are secured to the tower-collar 2 and casters 24 are secured to the caster supports 25. This embodiment allows the tower-collar 2 to rotate around the tower 1 on casters 24 rather than on the thrust bearing 19 shown in FIG. 1.

Figure 6:
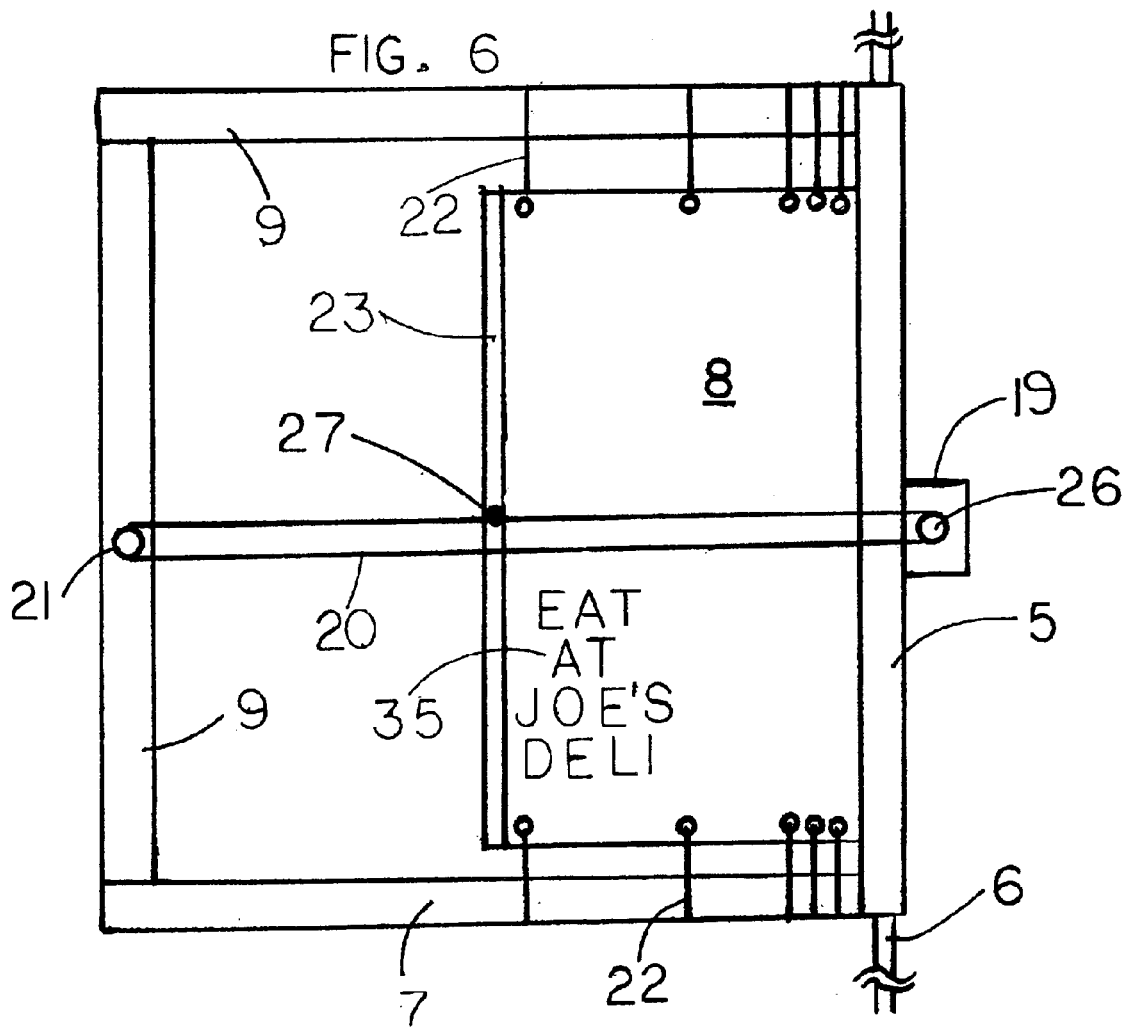
FIG. 6 is a side view of a sail for use with an embodiment of the invention.

Referring now to the drawing in FIG. 6 in detail, there is shown a side view of a single sail 8 of the present invention including a mast 6, a mast-collar 5, a boom 7, and a sail frame 9. In addition, FIG. 7 shows a means for reefing, or partially reefing, a sail during high winds. The reefing system consists of a remotely operated bi-directional motor 19 which is secured to the mast-collar 5. A drive pulley 26 controls a reefing line 20 which extends around a free-wheeling pulley 21 mounted on the frame 9. The reefing line 20 is attached to a batten post 27 which is secured to a batten 23 embedded in the sail 8. The sail 8 is flexible and is suspended by sliding rings 22 secured to the frame 9 above and to the boom 7 below. To reef a sail, the bi-directional motor 19 is operated drawing the sail 8 horizontally toward the mast-collar 5. To restore the sail 8 to its normal position the bi-directional motor 19 is operated drawing the sail away from the mast collar 5. A sail may be completely reefed, held stationary in a partially reefed position, or kept in the normal unreefed, position by the appropriate operation of the bi-directional motor 19. In FIG. 7 the sail 8 is shown held in a stationary, half-reefed, position. In another embodiment, the elements of the reefing system (bi-directional motor 19, drive pulley 26, reefing line 20, free-wheeling pulley 21, batten post 27, batten 23, and sliding rings 22) are rotated 90 degrees and the sail can then be reefed vertically, either upward or downward. Advertising, art, public interest notices, flags or other material of interest to the public 35 may be displayed as shown on sail 8. The device may also be displayed simply as a work of art in itself.

Referring now to the drawing in FIG. 7 there is shown a side view of another embodiment of the device having two levels of horizontal arms 4, one above the other secured to the tower-collar 2; the figure shows only one pair of horizontal arsm 4, it being understood that one or more additional pairs of horizontal arms may be secured to the tower-collar 2 (not shown). The figure shows the tower 1, tower-collar 2, generator 15, drive belt 14, shaft collar 3, thrust bearing 19, inner sail restraints 10, outer sail restraints 11, masts 6, mast-collars 5, sails 8, booms 7, and frames 9. The figure indicates that a sail 8 (and its mast 6, mast-collar 5, sail restraints 10, and 11, boom 7 and frame 9) may be mounted above as well as below a horizontal arm 4. In addition, the figure indicates that two (or more) sails 8 (and their masts 6, mast-collars 5, sail restraints 10, and 11, booms 7 and frames 9) may be mounted along each horizontal arm 4. In this figure the sails 8 should be understood having already gybed, are pushing their outer sail restaints 11, and the device is rotating toward the reader.

Figure 8A:
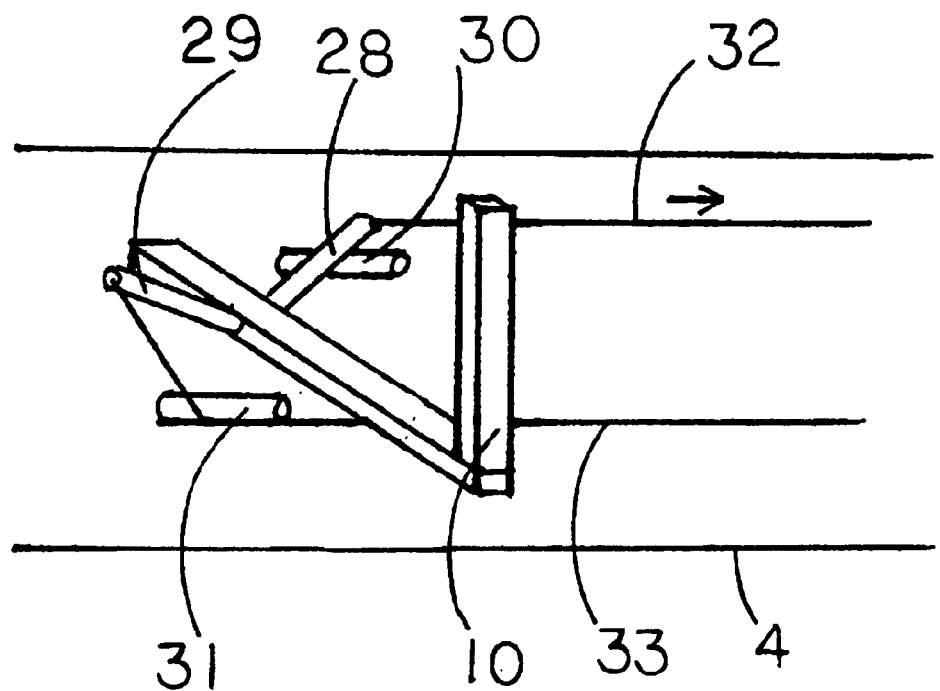
FIG. 8. is a perspective view of remotely operated cables, for use with an embodiment of the invention.
Figure 8B:
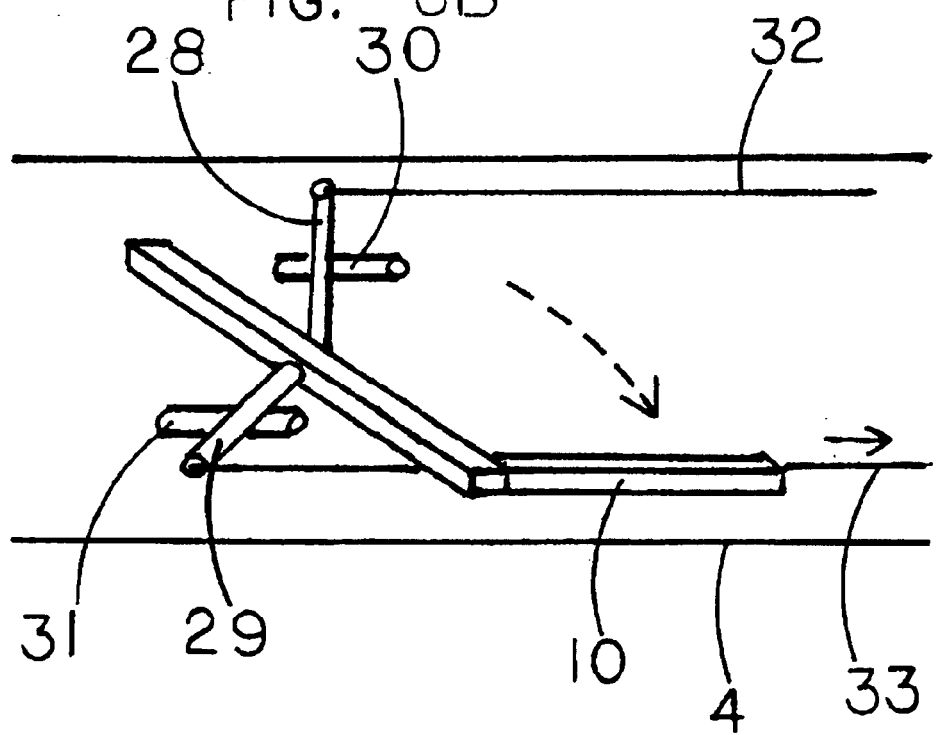

Referring now to the drawing in FIG. 8, there is shown a perspective view of a section of a horizontal arm 4 of the device, housing an inner sail restraint 10. The sail restraint 10 is shown in the vertical position in FIG. 8A, that is, in the position used during rotation of the device by wind power. The sail restraint 10 is held in the vertical position by means of a first cable 32 pulled in the direction shown by the arrow. The first cable 32 is secured to a first post 28. A first stop 30 limits the excursion of the sail restraint 10 to the vertical position when the first cable 32 is pulled. FIG. 8B shows the sail restraint 10 oriented in the horizontal position for, after being pulled to the horizontal position by a second cable 33 pulled in the direction shown by the arrow. The second cable 33 is secured to a second post 29. A second stop 31 limits the excursion of the sail restraint 10 to a horizontal position when the feathering cable 33 is pulled. The outer sail restraint (not shown) is controlled in the same way.

Referring now to the drawing in FIG. 9 there is shown a cross sectional, overhead view of another embodiment of the device at the level of the horizontal arms 4 and booms 7 showing the tower 1, tower-collar 2, mast 6, mast-collar 5, motorized sail restraint controllers 13, inner sail restraints 10 and outer sail restraints 11. The horizontal arm 4 in the 3 o'clock position has its inner sail restraint 10 mounted on the boom 7, rather than on the horizontal arm 4. The inner sail restraint 10 restrains the boom 7 (and sail, not shown) in the same way as it would if mounted on the horizontal arm 4, that is, it positions the boom 7 for an early gybe. The horizontal arm 4 in the 6 o'clock position has its outer sail restraint 11 mounted on the opposite side of the boom 7 rather than on the horizontal arm 4. The outer sail restraint 11 restrains the boom 7 (and sail, not shown) in the same way as it would if mounted on the horizontal arm 4, that is, it "catches" the boom 7 after its early gybe and allows gybe energy to add to the rotation of the device. The horizontal arms 4 in the 9 o'clock and 12 o'clock positions have their inner sail restraints 10 and outer sail restraints 11 rotated to the horizontal position for feathering by the motorized sail restraint controllers 13 mounted on the booms 7.

In an another embodiment, the device is used as a display device, in which the sails contain commercial advertising, public service messages, flags, art work or other material of interest to the public.

In another embodiment, the device is displayed as a work of art.

The present invention may be embodied in other specific forms without departing from the spirit or essential attributes thereof. Accordingly, reference should be made to the appended claims rather than to the foregoing specifications as indicating the scope of the invention.

I claim:

1. A vertical-axis-wind-turbine comprising:
    (a) a vertical tower;
    (b) a tower-collar disposed rotatably on said tower;
    (c) a horizontal arm attached to said tower-collar;
    (d) a mast attached to said horizontal arm;
    (e) a mast-collar disposed rotatably on said mast;
    (f) a boom secured to said mast-collar;
    (g) a sail, attached to said mast-collar and boom;
    (h) a first and second motorized sail-restraint controllers attached to said horizontal arm;
    (i) an inner adjustable sail restraint secured to said first motorized sail-restraint controllers positioned between said tower-collar and said mast-collar;
    (j) an outer adjustable sail restraint secured to said second motorized sail-restraint controllers positioned between said mast-collar and an end of said horizontal arm;
    whereby when said sail is driven by wind the sail is restrained from moving freely by the adjustable sail restraints, and
    whereby the inner adjustable sail restraint causes the sail to gybe at an earlier time than would otherwise occur; and
    whereby the outer adjustable sail restraint restrains the sail during its gybe, thereby capturing the energy of the gybe that would otherwise be lost, and
    whereby said sails that are moving into the wind are feathered, so that the vertical-axis-wind-turbine rotates in only one direction, regardless of the direction of the wind; and
    whereby the position of said adjustable sail restraints may be adjusted by said motorized sail restraint controllers so that said adjustable sail restraints do not restrain said sail, allowing said sail to be feathered during excessive wind speed.

2. The vertical axis windmill as claimed in claim 1 further comprising a generator driven by the tower-collar.

3. The vertical axis windmill as claimed in claim 1 in which the sail is secured to a frame, which is secured to the mast-collar and boom.

4. The vertical axis windmill as claimed in claim 1 further comprising a plurality of masts, mast-collars, booms, sails, and inner and outer sail restraints, aligned horizontally along each horizontal arm.

5. The vertical axis windmill as claimed in claim 1 further comprising a plurality of horizontal arms, masts, mast-collars, booms, sails, and inner and outer sail restraints mounted at a plurality of heights on the tower-collar.

6. The vertical axis windmill as claimed in claim 1 further comprising reefing means whereby an area of said sail exposed to the wind is adjustable.

7. The vertical axis windmill as claimed in claim 1 further comprising a display selected from the group consisting of: advertising, art, publicity, public interest notices, flags and other material of interest to the public.

8. The vertical-axis-wind-turbine as claimed in claim 1 further comprising cables to adjust the position of said adjustable sail-restraints, whereby the position of said adjustable sail restraints do not restrain said sails, allowing one or more of said sails to be feathered.

9. The vertical-axis-wind-turbine as claimed in claim 1 wherein said adjustable sail restraints, said masts, said mast-collars, said booms and said sails are oriented both upward and downward or either upward or downward on said horizontal arms.

10. The vertical-axis-wind-turbine as claimed in claim 1 wherein the first and second motorized sail restraint controllers and said inner and outer adjustable sail restraints are mounted on a first side of said boom, and a third and fourth motorized sail restraint controllers and a second inner and a second outer adjustable sail restraints are mounted on a second side of said boom, whereby a position of each of said adjustable sail restraints may be adjusted by one of said motorized sail restraint controllers, so that said adjustable sail restraints do not restrain said sail, allowing said sail to be feathered during high wind speed.

* * * * *